United States Patent [19]

Noriai et al.

[11] Patent Number: 4,803,129
[45] Date of Patent: Feb. 7, 1989

[54] MAGNETIC RECORDING MATERIAL

[75] Inventors: Naoshi Noriai; Tadao Tokushima, both of Shizuoka, Japan

[73] Assignee: Yamaha Corporation, Japan

[21] Appl. No.: 133,183

[22] Filed: Dec. 14, 1987

Related U.S. Application Data

[63] Continuation of Ser. No. 928,310, Nov. 6, 1986, abandoned.

[30] Foreign Application Priority Data

Nov. 9, 1985 [JP] Japan ................ 60-251797

[51] Int. Cl.$^4$ ................................................ G11B 7/24
[52] U.S. Cl. ................................ 428/694; 365/122; 369/13; 369/288; 428/900
[58] Field of Search .................... 428/694, 900, 928; 365/122; 369/13, 288; 360/130-135

[56] References Cited

FOREIGN PATENT DOCUMENTS 73746  5/1983  Japan .
88808  5/1984  Japan .
108304 6/1984  Japan .
87306  5/1986  Japan .

OTHER PUBLICATIONS

Aratoni et al., "Magnetic and Magneto-Optic-Properties of Tb-FeCo-Al Films", J. Appl. Phys. 57(1), Apr. 15, 1985, p. 3903.

*Primary Examiner*—Paul J. Thibodeau
*Attorney, Agent, or Firm*—Lerner, David, Littenberg, Krumholz & Mentlik

[57] ABSTRACT

In composition of Tb-Fe-Co type magnetooptic recording material, additional inclusion of specified amount of Be much improves corrosion resistance and Kerr rotation angle of a magnetooptic disc made therefrom.

1 Claim, 2 Drawing Sheets

A: [(Fe$_{0.75}$Co$_{0.25}$)$_{0.75}$Tb$_{0.25}$]$_{0.90}$Be$_{0.10}$
B: [(Fe$_{0.75}$Co$_{0.25}$)$_{0.75}$Tb$_{0.25}$]$_{0.95}$Al$_{0.05}$
C: (Fe$_{0.75}$Co$_{0.25}$)$_{0.75}$Tb$_{0.25}$

MAGNETIC RECORDING MATERIAL

This is a continuation, of application Ser. No. 928,310 filed 11/06/86, now abandoned.

BACKGROUND OF THE INVENTION

The present invention relates to an improved magnetooptic recording material, and more particularly relates to improvement in corrosion resistance of a Tb-Fe-Co type material used for magnetooptic discs suited for high density recording.

A magnetooptic disc is in general made up of a substrate and a thin film of magnetooptic material formed on the substrate in an arrangement such that its easy magnetization axis is perpendicular to the surface of the substrate. The thin film has a uniform magnetization direction.

At writing-in of signals, laser is applied to a portion of the thin film of a magnetooptic disc to raise its temperature up to near the Curie point, reverse weak magnetic field is applied to the portion under this condition by a magnetic head to reverse the magnetization direction of the heated portion and the heated portion is cooled down to the room temperature. Kerr effect is utilized in reading-out of signals from a magnetooptic disc. Polarized laser is applied to the thin film of the disc and difference in intensity of the reflective ray is detected, the difference being caused by difference in Kerr rotation angle ($\theta k$) of the plane of polarization. Signals read out are removed from recording Among various magnetic materials used for such magnetooptic discs, Tb-Fe-Co type magnetic material has won much recognitions. Such increasing use of this alloy is caused by the fact that the Curie point of this alloy is as low as 200° C. and magnetic reversion can be effected very easily. Since its coersive force (Hc) is about 240 kA/m, the alloy does not allow easy magnetic reversion at the room temperature, thereby assuring high recording stability. It is also easy with this alloy to enhance recording density of the magnetooptic disc.

Despite these advantages, Tb-Fe-Co type magnetooptic material is very vulnerable to corrosion due to inclusion of easily oxidizable Tb. Although additional inclusion of Al and/or Ti has been proposed, no satisfactory effects has ever been obtained.

SUMMARY OF THE INVENTION

It is the object of the present invention to provide a magnetooptic recording material having significantly high corrosion resistance.

In accordance with the present invention, a Te-Fe-Co type magnetooptic material further includes 1 to 20 atomic % of Be.

DESCRIPTION OF THE PREFERRED EMBODIMENT

Figure 1:
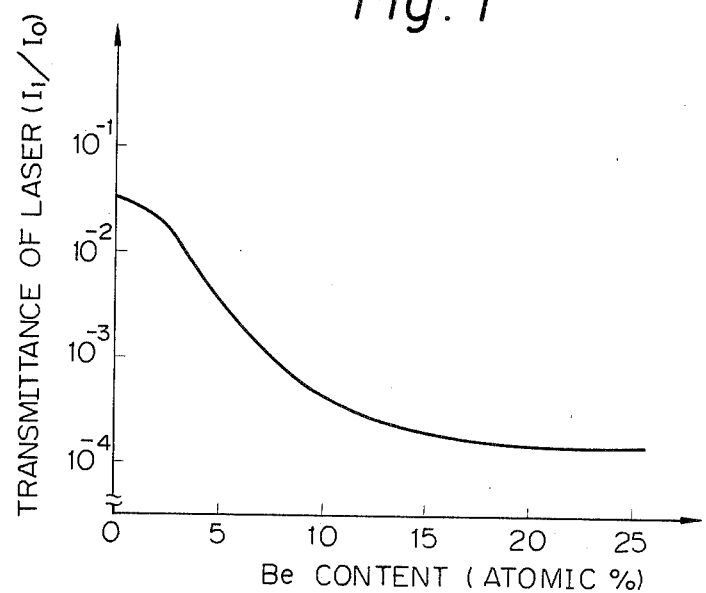
FIG. 1 is a graph for showing the relationship between the Be content and the transmittance of laser.

In accordance with the basic concept of the present invention, the composition of the Tb-Fe-Co alloy is such that the atomic ratio between Fe and Co is 30 to 95% of Fe and 5 to 70% of Co, the atomic ratio between (Fe-Co) and Tb is 60 to 80% of (Fe-Co) and 20 to 40% of Tb, and that the atomic ratio between (Fe-Co-Tb) and Be is 80 to 99% of (Fe-Co-Tb) and 1 to 20% of Be. In this case, the composition is given by

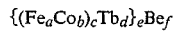

$\{(Fe_aCo_b)_cTb_d\}_eBe_f$ in which a to f indicate atom ratios, and a is in a range from 0.3 to 0.95, b in a range from 0.05 to 0.7, c in a range from 0.6 to 0.8, d in a range from 0.2 to 0.4, e in a range from 0.80 to 0.99 and f in a range from 0.01 to 0.20.

In accordance with a further embodiment of the present invention, the magnetooptic recording material may further include at least one of Al and Ti. In this case the composition is given by

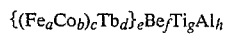

$\{(Fe_aCo_b)_cTb_d\}_eBe_fTi_gAl_h$ in which a to h again indicate atom ratios, and g is in a range from 0.01 to 0.20 and h in a range from 0.01 to 0.20.

When Be content falls short of 1%, no appreciable rise in corrosion resistance is obtained. Any Be content above 20% causes significant lowering in Kerr rotation angle ($\theta k$) and the product is quite unsuited for real use.

A film of the magnetooptic recording material is formed by spattering or evaporation on a transparent substrate made of polycarbonate resin, polymethylmetaacrylic resin, epoxy resin or glass. The thickness of the film should preferably be in a range from 50 to 100 nm. On the magnetooptic film, a thin additional film may be formed of conductive material such as $SiO_2$, AlN, $Si_3N_4$, SiC and MgF for further improvement of the corrosion resistance and concurrent enhancement of the Kerr rotation angle. Further, a reflective film may be formed on the magnetooptic film for utilization of Faraday effect.

EXAMPLES

Various magnetooptic discs were produced using the magnetooptic recording materials in accordance with the present invention.

EXAMPLE 1 OF PRODUCTION

A glass substrate was set in position in a vacuum chamber after proper surface cleaning and the inside pressure was lowered below 0.07mmPa. Tb metal, Fe-Co metal and Be metal placed in separate material hearths were placed in the vacuum chamber and electron beam of 4 kV×1000 mA was applied to the metals for evaporation. The evaporated metals were deposited on the substrate to form a thin film of 50 to 100 nm thickness. Deposition was carried out at a rate of 5 to 15 nm/min.

EXAMPLE 2 OF PRODUCTION

A glass substrate was set in a vacuum chamber after like surface cleaning and the inside pressure was lowered below 0.07 mmPa. Thereafter, argon gas of 99.99% purity was filled in the vacuum chamber until the inside pressure reaches 0.7 Pa. Prescribed amounts of Tb chips and Be chips were placed on a Fe-Co alloy target and this composite target was also placed in the argon filled chamber. By way of DC sputtering (400 V×0.5 A), a thin film of 50 to 100 nm thickness was formed on the glass substrate at a rate of 5 to 15 nm/min.

CONFIRMATION TEST 1

The magnetooptic disc obtained in Example 2 was immersed in NaCl solution of 25° C. for 100 min for confirmation of its corrosion resistance Evaluation of the corrosion resistance was carried out making use of the fact that, as a result of the immersion, generation of transparent oxidized Tb increases the transmittance of laser through the film. That is, the transmittance of laser (632.8 nm wavelength) through the film was measured and the results are shown in FIG. 1. In the graph, the Be content is taken on the abscissa and the transmittance of laser is taken on the ordinate. The transmittance of laser is given in the form of $I_1I_0$ provided that $I_0$ represents the transmittance through the glass substrate without the magnetooptic film and $I_1$ represent the transmittance through the glass substrate covered with the magnetooptic film.

It is clear from FIG. 1 that the Be content increases, the transmittance ($I_1$) decreases, leading to reduced generation of the oxidized Tb, which results in improved corrosion resistance, and that the effect saturates when Be content exceeds 12%. Same results were obtained when evaporation was employed for formation of the magnetooptic film.

CONFIRMATION TEST 2

Figure 2:
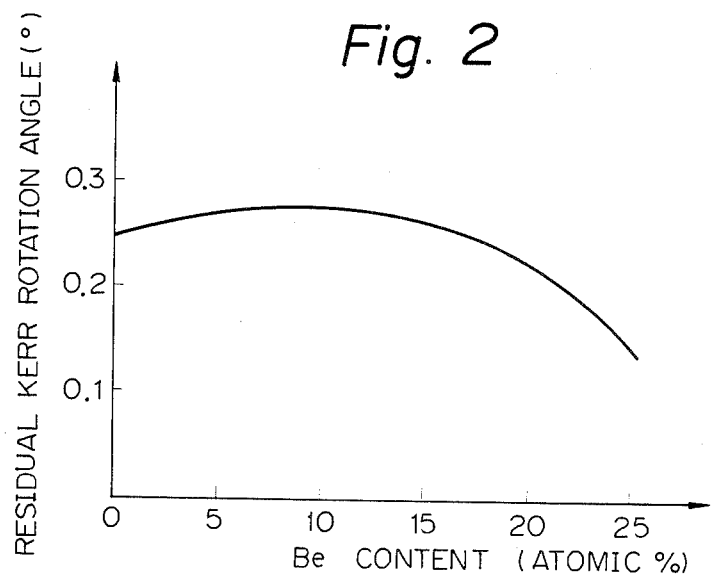
FIG. 2 is a graph for showing the relationship between the Be content and the residual Kerr rotation angle.

The magnetooptic disc obtained in Example 2 was subjected to measurement of residual Kerr rotation angle $\theta_k{}^r$ without any external magnetic field in order to know the relationship between the Be content and the residual Kerr rotation angle. The results are shown in FIG. 2. It is clear from the graph that any Be content exceeding 20% makes the residual Kerr rotation angle below 90% of that with no Be content and the product is quite unsuited for real use. With Be content up to about 16%, the residual Kerr rotation angle is larger than that with no Be content. The largest residual Kerr rotation angle is obtained when Be content is about 10%.

CONFORMATION TEST 3

In a manner same as that employed in Example 2, magnetooptic discs of the following three compositions were prepared.

A; $\{(Fe_{0.75}Co_{0.25})_{0.75}Tb_{0.25}\}_{0.90}Be_{0.10}$

B; $\{(Fe_{0.75}Co_{0.25})_{0.75}Tb_{0.25}\}_{0.95}Al_{0.05}$

C; $(Fe_{0.75}Co_{0.25})_{0.75}Tb_{0.25}$

Figure 3:
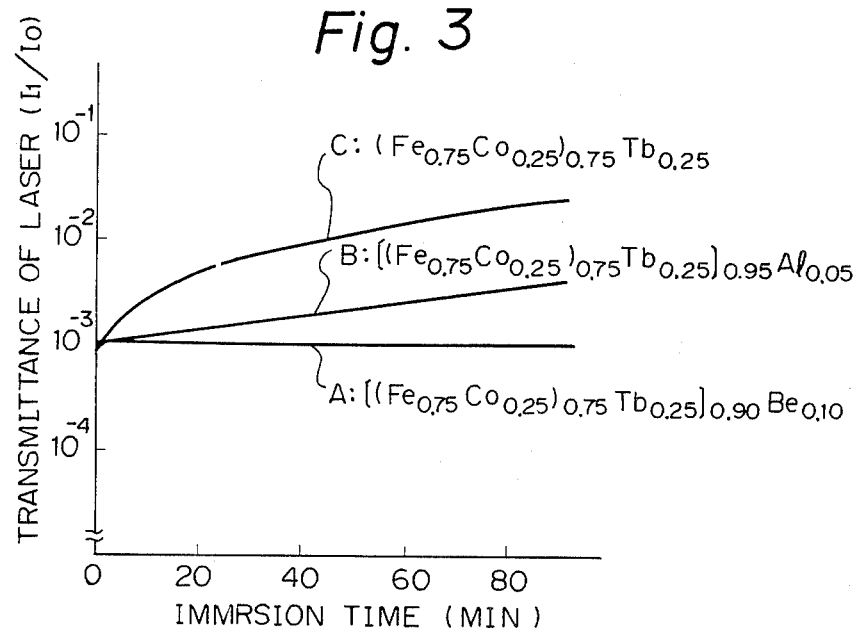
FIG. 3 is a graph for showing the relationship between the NaCl solution immersion time and the transmittance of laser.

The magnetooptic discs were immersed in NaCl solution for the prescribed length of time. Evaluation of the corrosion resistance was done in a manner same as that employed in Confirmation test 1, and the results are shown in FIG. 3. It is clear from the graph that corrosion advances with immersion time in the case of Fe-Co-Tb and Fe-Co-Tb-Al types. Whereas in the case of the disc of the present invention, i.e. Fe-Co-Tb-Be type, there is no substantial advance in corrosion.

CONFIRMATION TEST 4

Figure 4:
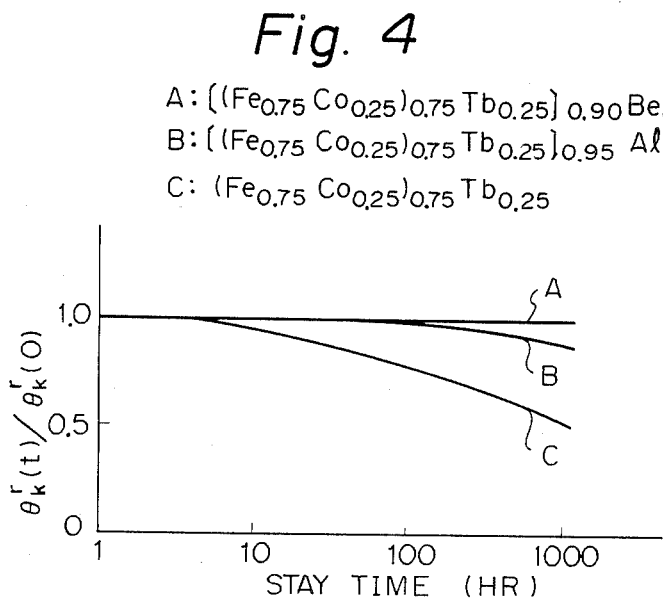
FIG. 4 is a graph for showing the relationship between the stay time under high temperature and humidity condition and the residual Kerr rotation angle.

Three magnetooptic discs of Confirmation test 3 were used. The discs were left for a prescribed length of time in an environment of 60° C.×90° RH for evaluation of corrosion. Evaluation was made in reference to the ratio $\theta_k{}^r(t)/\theta_k{}^r(0)$ of the residual Kerr rotation angle before and after stay in the environment. Here $\theta_k{}^r(0)$ indicates the residual Kerr rotation angle before the stay and $\theta_k{}^r(t)$ indicates that after the stay. The results are shown in FIG. 4. It is clear from the graph that absence of Be allows oxidization of Tb during the stay and results in small residual Kerr rotation angle. Inclusion of Be enables constant level of the residual Kerr rotation angle, thereby assuring high level of corrosion resistance.

As is clear from the foregoing descriptions, additional inclusion of specified amount of Be significantly improves corrosion resistance of the product to an extent such that no provision of an antioxidant protective layer is required. With a further specified amount of Be to be included, larger Kerr rotation angle may be obtained too.

I claim:

1. An improved magnetooptic recording material comprising a composition defined by

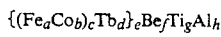

in which a to h indicate atomic ratios, and a is in a range from 0.3 to 0.95, b is in a range from 0.05 to 0.7, C is in a range from 0.6 to 0.8, d is in a range from 0.2 to 0.4, e is in a range from 0.80 to 0.99, f is in a range from 0.01 to 0.20, g is in a range from 0.01 to 0.20 and h is in a range from 0.01 to 0.20.

* * * * *

UNITED STATES PATENT AND TRADEMARK OFFICE
CERTIFICATE OF CORRECTION

PATENT NO. : 4,803,129

DATED : February 7, 1989

INVENTOR(S) : Horiai, et al

It is certified that error appears in the above-identified patent and that said Letters Patent is hereby corrected as shown below:

Title page:

In the listing of the Inventors, "Noriai" should read --Horiai--.

Item [19] "Noriai" should read --Horiai--.

Signed and Sealed this

Sixth Day of February, 1990

Attest:

JEFFREY M. SAMUELS

Attesting Officer

Acting Commissioner of Patents and Trademarks